June 24, 1924.

C. FREDBERG 1,498,617

OIL SUPPLY SYSTEM FOR MOTOR VEHICLES

Filed Jan. 19, 1923     2 Sheets-Sheet 1

Inventor
Carl Fredberg
By Chindahl, Parker & Carlson
Attys

June 24, 1924.                                                                1,498,617
C. FREDBERG
OIL SUPPLY SYSTEM FOR MOTOR VEHICLES
Filed Jan. 19, 1923          2 Sheets-Sheet 2

Inventor
Carl Fredberg

Patented June 24, 1924.

1,498,617

UNITED STATES PATENT OFFICE.

CARL FREDBERG, OF CHICAGO, ILLINOIS.

OIL-SUPPLY SYSTEM FOR MOTOR VEHICLES.

Application filed January 19, 1923. Serial No. 613,601.

*To all whom it may concern:*

Be it known that I, CARL FREDBERG, a citizen of the United States, residing at Chicago, in the county of Cook and State of Illinois, have invented a certain new and useful Oil-Supply System for Motor Vehicles, of which the following is a specification.

The invention pertains generally to the lubrication system of a motor vehicle, and has for its aim the production of a means operating automatically to maintain in the crank case of the motor a supply of oil ample to meet the requirements of the motor at all times and under varied operating conditions.

The object of the invention, more specifically stated, is to provide an oil feed mechanism of advantageous construction, operating automatically to supply to the crank case of the motor oil taken from a convenient source of supply external to the crank case.

A special object of the invention is to provide a float-controlled feed effective under the varied conditions of use of motor vehicles.

A general object is to provide a means for obtaining the objects thus above stated in a practical manner.

Figure 1:
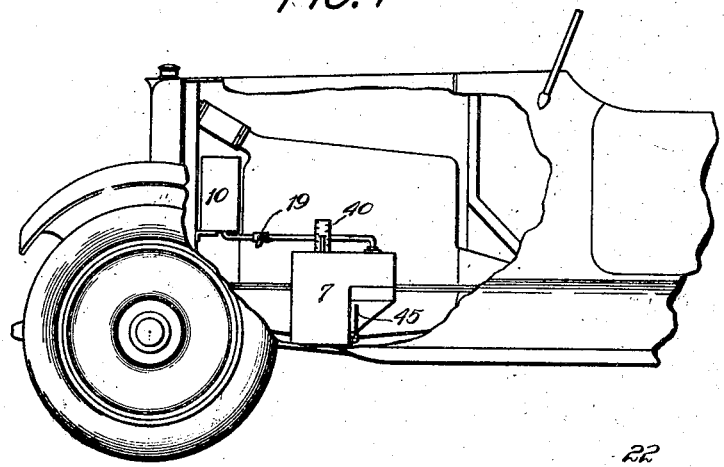
Figure 2:
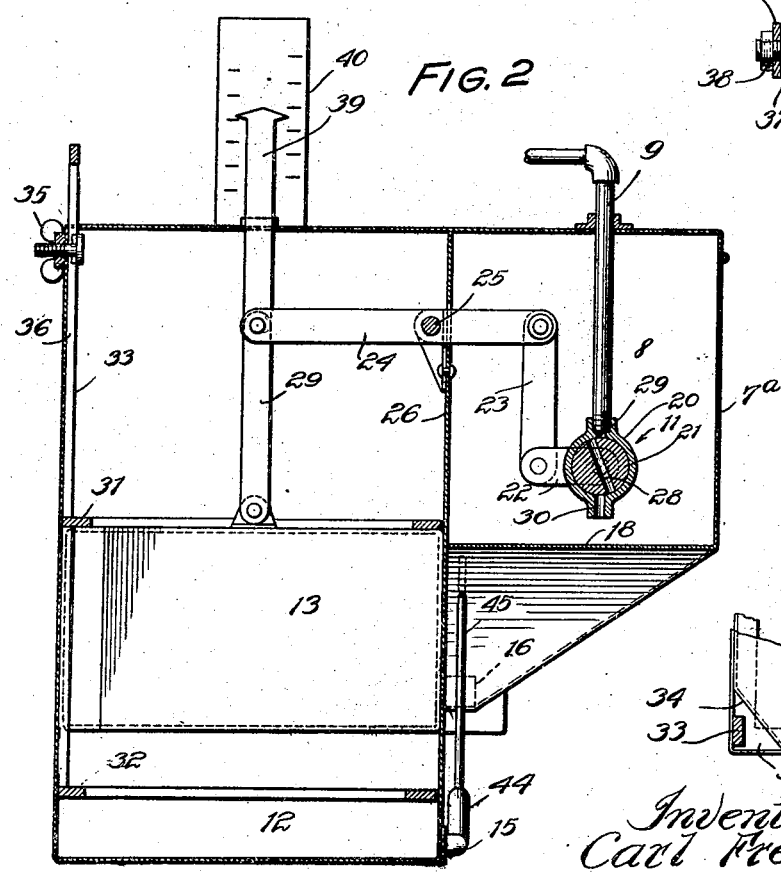
Figure 6:
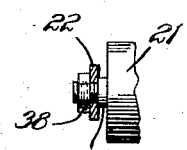
Figure 3:
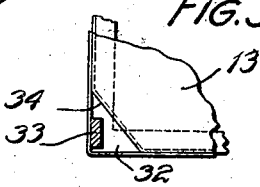
Figure 4:
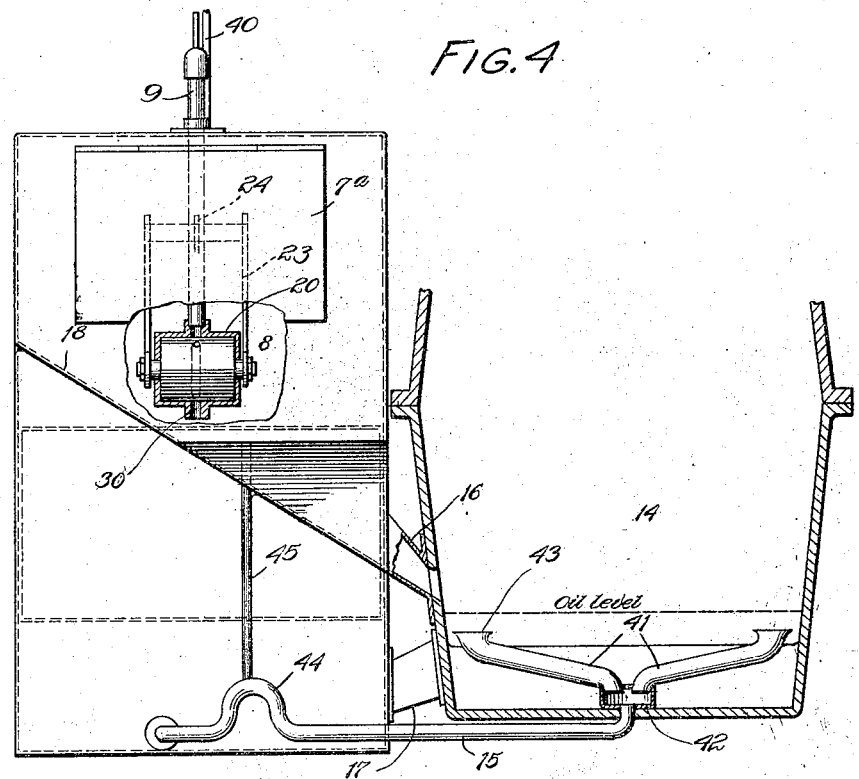
Figure 5:
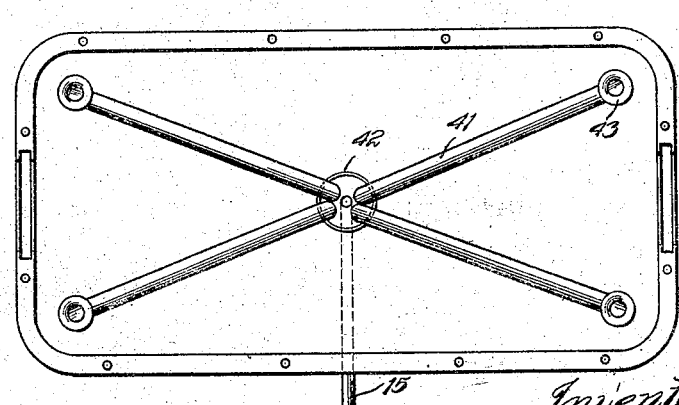

In the accompanying drawings I have illustrated but one embodiment of my invention although it is contemplated that those skilled in the art may employ other and equivalent means for accomplishing the improved results which I attain and in generally the same manner. Figure 1 is a fragmentary side elevational view of the forward portion of a motor vehicle, with the motor exposed and having my invention applied thereto. Fig. 2 is a fragmentary enlarged longitudinal sectional view showing details of construction. Fig. 3 is a fragmentary horizontal sectional view illustrating a float construction with stop means for limiting the movements of the float. Fig. 4 is an end view of the devce and illustrating it in connection with the crank case of a motor shown in transverse section, a portion of the device being broken away to show details of construction. Fig. 5 is a plan view of the crank case equipped with feeders for supplying oil to the float chamber. Fig. 6 is a detail view of the valve member and its actuating means.

The device comprises a casing 7 adapted to be applied to the engine of a motor vehicle as, for example, to one side thereof adjacent the crank case. This casing (Fig. 2) provides a feed chamber 8 to which oil is supplied by means of a pipe 9 from an elevated tank or reservoir 10 (Fig. 1) under the control of a valve 11. The casing 7 also provides a float chamber 12 having a float 13 therein operatively connected with the valve 11. The float chamber is in communication with the engine crank case, designated generally by the numeral 14, by way of a pipe 15. The feed chamber 8 is connected with the crank case 14 as by means of a tubular member 16 (Fig. 4) so that the oil fed to this chamber under the control of the valve 11 flows into the crank case. The arrangement is such that as the height of the oil level rises in the crank case, the float is actuated to operate the valve 11.

The casing 7 may be of any suitable or preferred construction, being preferably made of sheet metal; and it may be supported adjacent the crank case, preferably at one side thereof, as by means of one or more brackets 17. Herein the feed chamber 8 is constructed with a bottom wall 18 inclined first inwardly, as shown in Fig. 4, and then longitudinally as shown in Fig. 2, the tubular member 16, constituting the connection between the chamber and the crank case, being located at the bottom of the longitudinally inclined portion.

The oil supply tank 10 may be located at any convenient or preferred point, being herein shown as secured upon the rear side of the radiator forwardly of the motor. The pipe 9 leading from the tank 10 to the feed chamber 8 may have a manually operable valve 19 therein to be closed when the crank case is being drained.

The valve 11 may comprise a cylindrical casing 20 (Figs. 2 and 4) in which is rotatably mounted a valve member 21 having rigid therewith a pair of arms 22 connected by links 23 with a lever 24. The latter may conveniently be pivoted between its ends upon a pin 25 suitably supported upon a partition wall 26 between the feed and float chambers, said wall being slotted for this purpose. The end of the lever opposite the link 23 is connected by means of a link 27 with the float 13. It will thus be seen that up and down movements of the float are imparted to the valve member. The latter is provided with a transverse port 28 communicating at one end with the inlet opening 29 in the valve casing into which the pipe 9 enters. The opposite end of the port 28 is adapted to register with an outlet port 30 in the valve casing.

In the float chamber 12 I provide a pair of stops 31 and 32 for limiting the up and down movements of the float 13. These stops are so arranged that when the float engages with the upper stop by reason of a raising of the oil level in the chamber, the valve 11 is closed; and when the float engages with the lower stop by reason of a drop in the oil level in the chamber, the valve is opened to its maximum degree. When it is desired to vary the height of the oil level maintained in the crank case, this is accomplished by adjusting the stops 31 and 32, and also the connection between the valve member and the float. These adjustments may be effected by any suitable means. The former in the present instance is accomplished by the adjustment of a single vertical rod 33 mounted for up and down movement within the float chamber, at one corner thereof, and carrying stops 31 and 32 which in the present instance are in the form of rectangular frames. To accommodate the rod 33, the corner of the float 13 is cut away as at 34. A thumb screw 35 near the upper end of the chamber enters a slot 36 in the rod and serves to hold the same and thereby the stops at the desired elevation.

The adjustment between the float 13 and the valve 11 is accomplished in the present instance by adjustably securing the arms 22 upon stems 37 rigid with the valve member 21 and extending through the casing 20, the stems being provided with nuts 38 for this purpose. When the positions of the stops 31 and 32 are varied, the position of the valve member 21 with respect to the lever 22 is correspondingly varied so that the port 28 in the valve member shall be properly positioned with respect to the inlet and outlet openings 29 and 30 when the float engages the upper and lower stops, as above set forth. To gain access to the valve 11 a door 7ª may be provided in the casing 7, opening into the feed chamber 8.

It may happen that after the valve has been moved in the upward movement of the float, into closed position, the height of the oil level in the crank case will for some cause—for example the flow of the oil which has been discharged from the valve into the crank case—increase slightly. Such increase in the oil level when communicated to the float chamber, tends to raise the float and if desired the stops may be relatively positioned so as to permit the float to rise, moving the valve member sufficiently to carry the port 28 slightly beyond the inlet port 29. It will thus be apparent that a corresponding reduction in the height of the oil level will be necessary before the feeding of the oil is resumed. This may be advantageous by reason of its preventing relatively slight fluctuations in the height of the oil level from rendering the valve effective to feed oil to the crank case.

For the purpose of indicating the movements of the float to the operator, and for facilitating the adjustment thereof, the arm 27 is continued upwardly to form a pointer 39 coacting with a scale carried upon the face of a plate 40 rising from the casing 7, a suitable aperture being provided in the top wall of the casing for guiding the pointer in its up and down movements.

Communication between the crank case and the float chamber is effected by means of the pipe 15 (best shown in Fig. 4) having at one end a plurality of feeders 41 communicating with the interior of the crank case and preferably projecting upwardly a short distance above the bottom wall, near opposite ends thereof. These feeders are in the form of separate pipes preferably arranged diagonally and extending from the opposite corners of the crank case to a point centrally thereof, discharging into a common receptacle 42 from which leads the pipe 15. In the present instance these feeders are placed within the crank case, and the pipe 15 enters through the bottom of the crank case. It will be obvious, however, that the feeders may be externally located, if desired, with their free ends only projecting upwardly into the crank case. Herein the free ends of these feeders are enlarged somewhat as at 43. Their function is to maintain at all times under varying conditions of use of the vehicle a substantially constant pressure in the float chamber. Thus it will be seen that when the crank case is inclined either longitudinally or laterally, the oil will continue to flow into the pipe 15 from all of the feeders.

In order further to reduce fluctuations of the float due to slight changes in the level of the oil in the crank case, I provide in the pipe 15, adjacent its connection with the float chamber, an inverted U-shaped portion 44 tending to retard the flow of oil through the pipe which tends to prevent changes in the oil level in the crank case from being communicated to the float chamber. If desired, a riser 45 may be extended from the U-shaped portion 44 along the pipe 15 into the feed chamber 8, so that in case of extreme pressure upon the float 13 when the latter has engaged the stop 31, the oil may overflow into the feed chamber and from thence return to the crank case.

It will be seen that I have produced a means for insuring an ample supply of oil in the crank case under various conditions of use of motor vehicles. Moreover, it is possible to vary the volume of oil to be maintained in the crank case, as may be desired.

I claim as my invention:

1. An oil supply system for internal combustion engines comprising, in combination with the crank case of the engine, a float chamber, a feed chamber, said float chamber having a float therein and said feed chamber having a valve operatively associated with the float, means connecting the feed chamber with the crank case, said valve being in communication with a source of oil supply, and means establishing communication between the crank case and the float chamber.

2. The combination with a crank case of an internal combustion engine, of a float chamber communicating with said crank case and having a float therein, a feed chamber also communicating with the crank case, means for supplying oil to the feed chamber including a valve operatively connected with the float, and means for limiting the upward movement of the float, said valve being arranged to be closed in the last mentioned position of the float.

3. The combination with a crank case of an internal combustion engine, of a float chamber having a float therein, a pipe providing an inlet for the float chamber, a plurality of feeders for the pipe communicating with the crank case at opposite corners thereof, and valve controlled means actuated by the float for supplying oil to the crank case.

4. The combination with an internal combustion engine having an oil reservoir, a chamber having a member therein responsive to variations in the level of oil in the chamber, means connecting the oil reservoir with the chamber including a plurality of pipes opening upwardly into the reservoir near the bottom thereof but at opposite ends of the reservoir, and valve-controlled means arranged to be actuated by said member for supplying oil to the reservoir.

5. The combination with an internal combustion engine having an oil reservoir, of a chamber having a float therein, a pipe leading into said chamber, a plurality of feeders communicating at one end with the pipe and opening into the reservoir at spaced points therein, the upper open ends of said feeders being normally submerged below the level of the oil in the reservoir, and valve-controlled means arranged to be actuated by said float for maintaining the supply of oil in the reservoir substantially constant.

6. An oil supply means for internal combustion engines comprising a chamber communicating with the crank case of an engine so that the level of oil in the crank case and in said chamber are substantially the same, a float in said chamber, and valve-controlled means arranged to be actuated by said float for maintaining a predetermined oil level in the crank case, said float chamber having stop means therein adjustable to vary the upper and lower limits of movement of the float, and said valve being adjustable with respect to the float so as to be closed when the float is in its uppermost position and to be open when the float is in its lowermost position.

7. An oil supply means for internal combustion engines comprising, in combination, a chamber communicating with the crank case of the engine so that the level of the oil in the chamber is substantially the same as in the crank case, a member in said chamber responsive to variations in the oil level, an oil supply tank, means connected with said tank for feeding oil to the crank case including a valve operatively connected with said member, means for varying the limit of movement of said member in opposite directions, and means for adjusting the valve member so that when said member is at its upper limit of movement the valve is moved into closed position and when the member is at its lower limit of movement the valve is in open position.

8. An oil feeding means for internal combustion engines comprising, in combination, a chamber communicating with the crank case of the engine, a member in said chamber responsive to the variations in the level of oil in the chamber, a feed chamber, a supply tank having a pipe leading to the feed chamber, a valve in said pipe for controlling the flow of oil into the feed chamber, a link and lever means operatively connecting the member in the first mentioned chamber with said valve, and means providing an outlet from the free chamber to the engine crank case.

9. An oil feed system for internal combustion engines comprising a float chamber communicating with the crank case of the engine and having a float therein, a feed chamber having a valve therein operable to control the flow of oil to the feed chamber from a source of oil supply, means operatively connecting said valve with the float, and a unitary means for adjusting the upper and lower limits of movement of the float.

10. An oil feed system for internal combustion engines comprising a float chamber communicating with the crank case of the engine and having a float therein, a feed chamber having a valve therein operable to control the flow of oil to the feed chamber from a source of oil supply, means operatively connecting said valve with the float, and a unitary means for adjusting the upper and lower limits of movement of the float comprising a pair of stops, a rod upon which said stops are fixed, and means for adjustably securing said rod to one wall of the float chamber.

11. An oil feed system for internal combustion engines comprising a float chamber communicating with the crank case of the engine and having a float therein operable to control the flow of oil to the feed chamber from a source of oil supply, means operatively connecting said valve with the float, means for adjusting the upper and lower limits of movement of the float, and an indicating means operatively associated with the float for facilitating the adjustment of said stops.

12. An oil feed system for internal combustion engines comprising a float chamber communicating with the crank case of an engine and having a float therein, a feed chamber having a valve therein communicating with a source of oil supply and adapted to discharge into the feed chamber, means operatively connecting the float with said valve whereby as the height of the oil level in the crank case rises the supply of oil thereto is cut off and as the oil level falls the supply of oil in the crank case is restored, and means providing an outlet between the feed chamber and the crank case, the bottom wall of the feed chamber being inclined so as to cause the oil to flow toward said outlet.

In testimony whereof, I have hereunto affixed my signature.

CARL FREDBERG.